(12) United States Patent
Fellinger et al.

(10) Patent No.: US 11,326,080 B2
(45) Date of Patent: May 10, 2022

(54) SELF-STICK INSULATION AND METHODS

(71) Applicant: JOHNS MANVILLE, Denver, CO (US)

(72) Inventors: Thomas John Fellinger, Littleton, CO (US); Guodong Zheng, Highlands Ranch, CO (US); Ames Kulprathipanja, Broomfield, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 94 days.

(21) Appl. No.: 16/728,218

(22) Filed: Dec. 27, 2019

(65) Prior Publication Data

US 2020/0131412 A1    Apr. 30, 2020

Related U.S. Application Data

(62) Division of application No. 15/414,240, filed on Jan. 24, 2017, now Pat. No. 10,563,101.

(51) Int. Cl.
| | | |
|---|---|---|
| *C09J 125/08* | (2006.01) | |
| *C09J 133/02* | (2006.01) | |
| *C09J 7/32* | (2018.01) | |
| *C09J 7/22* | (2018.01) | |
| *C09J 129/04* | (2006.01) | |
| *C09J 103/00* | (2006.01) | |
| *C09J 7/38* | (2018.01) | |
| *C08K 5/17* | (2006.01) | |
| *B32B 17/02* | (2006.01) | |
| *E04B 1/76* | (2006.01) | |

(52) U.S. Cl.
CPC ............. *C09J 125/08* (2013.01); *B32B 17/02* (2013.01); *C09J 7/22* (2018.01); *C09J 7/32* (2018.01); *C09J 7/38* (2018.01); *C09J 103/00* (2013.01); *C09J 129/04* (2013.01); *C09J 133/02* (2013.01); *E04B 1/7666* (2013.01); *B32B 2307/304* (2013.01); *C08K 5/17* (2013.01); *C09J 2301/204* (2020.08); *C09J 2301/302* (2020.08); *C09J 2301/408* (2020.08); *C09J 2403/00* (2013.01); *C09J 2425/00* (2013.01); *C09J 2429/00* (2013.01); *C09J 2433/00* (2013.01)

(58) Field of Classification Search
None
See application file for complete search history.

(56) References Cited

U.S. PATENT DOCUMENTS

2014/0234593 A1    8/2014   Umeda et al.
2015/0367977 A1   12/2015   Cho et al.

*Primary Examiner* — Frank D Ducheneaux
(74) *Attorney, Agent, or Firm* — Robert D. Touslee

(57) ABSTRACT

A method of using a self-stick insulation. The method includes providing a piece of insulation product with an adhesive coating. The adhesive coating includes polystyrene-maleic anhydride (SMA) and/or polyacrylic acid (PAA); an alcohol amine; and at least one of a polyvinyl alcohol and a starch. The adhesive coating is then activated with liquid water. Once the adhesive coating is active, the insulation product is attached to a surface with the adhesive coating.

10 Claims, 4 Drawing Sheets

SELF-STICK INSULATION AND METHODS

CROSS REFERENCE TO RELATED APPLICATIONS

This application is a division of pending U.S. patent application Ser. No. 15/414,240, filed Jan. 24, 2017 now U.S. Pat. No. 10,563,101.

FIELD OF THE INVENTION

This disclosure generally relates to insulation.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Pre-formed insulation products (batts, blankets, boards, etc.) are applied to various structures and equipment using a variety of fastening techniques. For example, in wood framed wall applications, faced batt insulation are typically stapled to perimeter framing members of each cavity via a stapling flange on the facing. Similarly, un-faced batt insulation used for framed walls (wood or steel stud) is typically held in place with a friction fit. For crawl spaces, lightning rods or other mechanical fastening devices are typically used to hold the insulation in place. Foam boards are generally glued to framing members and/or fastened with nails or other fasteners. Insulation may also be coupled to surfaces using adhesives. The adhesives are generally applied to the insulation right before installation. Typical adhesives include solvent-based products, hot melts, and pressure sensitive adhesives. Unfortunately, these adhesives may be expensive and/or require the use of personal protective equipment (PPE) to protect workers from burns, volatile organic compounds (VOC), etc.

BRIEF SUMMARY

The present disclosure is directed to various embodiments of self-stick insulation. In an embodiment, a self-stick insulation product defines a length, a width, and a thickness. A first major surface and a second major surface extend the length and the width of the insulation product. An adhesive coating is applied to the first major surface of the insulation product. The adhesive coating includes polystyrene-maleic anhydride (SMA) and/or polyacrylic acid (PAA); alcohol amine; and at least one of a polyvinyl alcohol and a starch. The adhesive is activated with the application of liquid water.

In another embodiment, a method of making a self-stick insulation is described. The method includes providing a piece of insulation product. A water activated adhesive coating is then applied to a surface of the insulation product. The water activated adhesive coating includes polystyrene-maleic anhydride (SMA) and/or polyacrylic acid (PAA); alcohol amine; water, and at least one of a polyvinyl alcohol and a starch. The adhesive coating is dried to evaporate the water to form a dry adhesive coating layer on the surface. To activate the adhesive, water is applied to the coating.

In another embodiment, a method of using a self-stick insulation is provided. The method includes providing a piece of insulation product with an adhesive coating. The adhesive coating includes polystyrene-maleic anhydride (SMA) and/or polyacrylic acid (PAA); alcohol amine; and at least one of a polyvinyl alcohol and a starch. The adhesive coating is then activated with liquid water. Once the adhesive coating is active, the insulation product is attached to a surface with the adhesive coating.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

Figure 1:
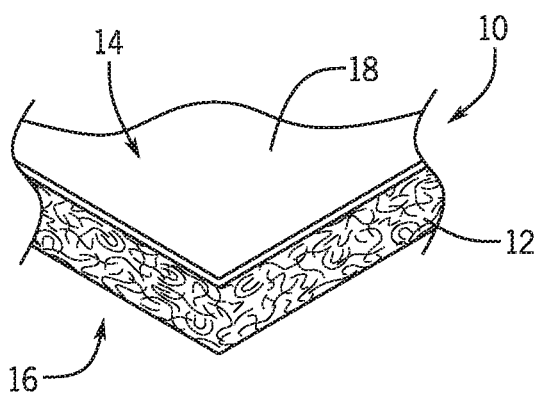
FIG. 1 is a perspective view of an embodiment of an insulation product.

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments discussed below include insulation products that are "self-stick." The term self-stick refers to the insulation products ability to bond or adhere to an object without the need to apply an adhesive or glue immediately before pressing the insulation product on the object for which bonding is intended. The term self-stick does not imply that an adhesive is not used to adhere the insulation product to a surface, but rather, that a user need not apply the adhesive immediately before installation. Because the user is not required to apply the adhesive immediately before installation, installation time is reduced, the user is less exposed to various chemicals (e.g., VOCs), and is protected from potential burns (e.g., hot melt adhesives).

The embodiments described herein are generally referred to as insulation products which may include fibrous insulation and/or insulation boards. These terms are used merely for convenience in describing the embodiments and are not meant to limit the invention to any one type of insulation product unless indicated. These terms may include any insulation type products, which could be made of various fibers, foams, and the like. Common types of insulation products include fiberglass, mineral wool, slag wool, rock wool, foam or other insulation boards, and the like, which may include facers. The disclosure also uses the terms "re-adherable" or "rebondable" to describe how liquid water (i.e., non-gaseous or vapor water) may be applied to the dried adhesive to activate the adhesive for bonding, adhering, or coupling with another object.

In operation, the dry adhesive film or coating activates in the presence of liquid water and not in the presence of humidity. For example, the thin film or coating of the dry adhesive on the insulation or flange may be moistened with a fine water mist with a sprayer, sponge, and the like, and allowed a few seconds to change phase from a sold to a gel or viscous liquid. The insulation product can then be placed and pressed in position, held for several seconds, and released. After the moistened adhesive gel or liquid dries, a bond forms between the insulation product and the application surface that holds the insulation product in place. In some embodiments, a surface (e.g., a wall) intended for the insulation product may be wet with a sponge or sprayer and then the insulation product positioned and pressed against the surface to adhere the insulation to the surface.

In some embodiments, the adhesive may be applied to a surface of the insulation product by spraying the adhesive onto the surface and/or onto a flange of the insulation product via a spray header and pump assembly. The application of the adhesive may occur during an insulation manufacturing process or by a secondary fabricator. The applied adhesive forms a thin film or coating of adhesive on the insulation surface. In another embodiment, the adhesive can be applied using an adhesive-filled trough and by pulling the insulation mat through the trough at a controlled speed such that a film coating or layer forms on the insulation product's surface.

The wet adhesive film, layer, or coating may then be dried via a curing oven, infrared oven, some other heat source, or air dried before the insulation product is further processed and packaged, such as by rolling the insulation product for shipment to another facility. In some embodiments, the dry adhesive coated insulation product may then be shipped to in weather tight packaging to avoid exposure to liquid water and thus reactivation of the adhesive during shipment and/or storage.

In some embodiments, a facer material may couple to the insulation product using the water activated adhesive coating. The facer material may be a paperboard or cardboard material (e.g., kraft paper), foil, scrim, polymer material, and the like, or any combination thereof (e.g., foil, scrim, kraft (FSK)). In some embodiments, the insulation product may be transported to a separate facility after the adhesive is applied and dried. The separate facility may then bond the facer material to the insulation product by reactivating the adhesive with liquid water. In some embodiments, the insulation product may be precut into desired shapes before shipment to facilitate future installation.

During installation installers wet the dry adhesive layer or coating with liquid water and apply the insulation product to one or more objects. For example, the installers simply need a water application device, such as a sprayer, sponge, etc. to apply liquid water to reactivate the adhesive. The installers may therefore avoid handling additional glues and/or adhesives while installing the insulation product and the associated exposure to volatile organic compounds (VOCs).

The adhesive coating enables the insulation product to couple to a variety of objects with or without the use of clips, pins, staples, etc. These objects may include metal surfaces such as ducts, pipes, machine components (e.g., HVAC systems, cars). In some embodiments, the insulation product may be installed between studs or joints (e.g., metal, wood) of a building or home. In another embodiment, the insulation product may be adhered to garage door panels (e.g., plastic, wood, metal) to insulate a home or a building's garage.

When the dry adhesive layer or coating is wetted and pressed against an object, the adhesive may have a "working time" or tack time in which the installer is able to adjust the position of the insulation product relative to the object. In other words, the adhesive may have a period of time before it completely or significantly sets and the insulation product is firmly held in place. The adhesive's working time allows the installer to move or shift, or even remove, the insulation product in case of misalignment, improper installation, and the like. For example, the working time or tack time may be less than 30 seconds. In another embodiment, the installer may have 15 seconds or less, 10 seconds or less, 5 seconds or less before the adhesive sets and adheres to the object. In still another embodiment, the adhesive may become tacky within 4-8 seconds to the point that the insulation product may be applied to an object's surface and remain in place.

As explained above, the adhesive reactivates when liquid water is applied. In some embodiments, the adhesive may become sufficiently tacky upon an application of as little as 1%, 2%, 3%, 4%, 5% liquid water by weight of the insulation product. In another embodiment, the adhesive may become sufficiently tacky upon an application of water between about 5% and 15% by weight of the insulation product. This range allows the adhesive to become tacky without becoming overly fluid and/or without saturating the insulation product with water and thereby increasing the weight that must be supported by the adhesive and/or the drying time. As described herein, the water may be applied by spraying a fine mist over the dry adhesive layer, film, or coating, or by applying the water with a sponge. Although the adhesive is reactivated upon the application of liquid water, the adhesive may not reactivate even when subjected to high humidity and high heat conditions. For example, the adhesive may remain in the nonadherable or nonbondable state even when subjected to a relative humidity as high as 90% or more at 100 degrees Fahrenheit. As such, the insulation product may be shipped to and installed in areas of high heat and humidity without negatively affecting the insulation product's performance.

The adhesive may be applied to the insulation product so as to form a non-continuous and/or non-uniform layer, film, or coating atop the insulation product's surface. For example, the adhesive material may be applied to the insulation product's surface in a patterned arrangement (e.g., S-pattern, parallel or crossing lines, honeycomb pattern, dot pattern, splat pattern, and the like). Once applied and dried, the adhesive coating may comprise between 1% and 8% by weight of the insulation product. In other embodiments, the dry adhesive layer, film, or coating may comprise between 3%-6%, 1%-4%, 3%-4% by weight of the insulation product. In still other embodiments, the dry adhesive coating may be 1-6 grams per square foot, 2-4 grams per square foot, 3-4 grams per square foot, etc. These small amounts of adhesive coating on the insulation product enable rapid reactivation and bonding while reducing costs and providing sufficient support for the insulation product.

The adhesive is formed by combining polystyrene-maleic anhydride (SMA) and/or polyacrylic acid (PAA); an alcohol amine; a polyvinyl alcohol and/or starch; and water to form an adhesive mixture. It is this mixture that is then sprayed, roll-coated, etc. onto the insulation product. The polystyrene-maleic anhydride (SMA) and/or polyacrylic acid (PAA); alcohol amine; polyvinyl alcohol and/or starch. These components may be referred to as solids in this adhesive mixture. In some embodiments, the percentage of solids in the adhesive mixture is between 30-50% with water making up the remainder of the mixture. The high percentage of solids in the adhesive mixture facilitates a rapid drying of the adhesive (i.e., reduced tack or set time) by reducing the amount of water that needs to evaporate. In another embodiment, the percentage of solids in the adhesive mixture may be between 35-40%. The combination of these materials in the proportions disclosed below reduce flammability, smoking, and corrosion of the adhesive enabling the use of the adhesive in the applications discussed above and below.

In operation, the components of the adhesive mixture serve specific purposes that either facilitate formation of the adhesive and/or give the adhesive specific properties. For example, the alcohol amine serves as a pH stabilizer, fire retardant, and a corrosion inhibitor. The alcohol amine component of the adhesive mixture may include at least one of monoethanolamine (MEA); diethanolamine (DEA) and triethanolamine (TEA). In some embodiments, the percentage of the alcohol amine component of the adhesive mixture may be 10-15% by weight of the solids in the adhesive mixture. It has been found that too much alcohol amine in the adhesive enables moisture in the air to activate the adhesive, while too little reduces the fire resistance of the adhesive. Accordingly, the preferred percentage of alcohol amine should be 11-13% by weight of the solids in the adhesive mixture to reduce and/or block moisture in the air from unintentional activation of the adhesive while still providing fire resistance. In some embodiments, the alcohol amine enables the adhesive coating to pass the E84 fire test.

The polyvinyl alcohol and/or starch component of the adhesive mixture provides the adhesive with all or a majority of its tackiness/stickiness. This component may be 30-60% by weight of the solids in the adhesive mixture to provide an adequate amount of tackiness/stickiness. The polyvinyl alcohol may also increase the flexibility of the adhesive. In other words, the polyvinyl alcohol may reduce and/or prevent the adhesive from becoming to brittle and/or cracking after and/or before installation. Polyvinyl alcohol may also assist in resisting activation of the adhesive from moisture in the air.

The other major portion of the adhesive mixture may include at least one of polyacrylic acid (PAA) and styrene maleic anhydride copolymer (SMA). This portion of the adhesive mixture may be 30-55% by weight of the solids in the adhesive mixture in order to reduce the viscosity of the mixture to ensure adequate mixing of all the components of the adhesive mixture. In embodiments that contain SMA or/and PAA, the SMA or/and PAA may contribute to the overall tackiness/stickiness of the adhesive.

In some embodiments, the SMA and/or PAA, may have a relative low molecular weight in order to lower the viscosity. It has been found that too high molecular weight of SMA and PAA increases the viscosity, while too low of a molecular weight reduces the tackiness and adhesion. The molecular weight of SMA and PAA may be 500-5,000 (g/mol).

In some embodiments, SMA may be pre-hydrolyzed in water at elevated temperature to be water soluble. The ammonia may be added during the hydrolysis reaction. For example, ammonia may operate as a hydrolysis accelerator in the reaction that forms the adhesive mixture. In embodiments that use ammonia, the ammonia may be 2.5-3.5% by weight of the adhesive mixture.

In some embodiments, the pH of the adhesive mixture may be adjusted to an optimal pH. It has been found that if adhesive mixture has a low pH corrosion may increase and that if the pH is to high the adhesion/tackiness may decrease. An optimal pH for the adhesive mixture may therefore be between 5.5-7.5 pH.

As explained above, the adhesive may couple an insulation product to a variety of surfaces. Below are various tables illustrating tests conducted with the adhesive material under various conditions and with different materials.

Table 1 reflects the test results of the adhesive using the standards of ASTM C 916 (Standard Specification for Adhesives for Duct Thermal Insulation).

TABLE 1

| Required Testing | Material | Requirement/Allowable | Status |
|---|---|---|---|
| D 903 Bonding Strength (Ambient) | Galvanized Steel/ Canvas/SSA | 0.5 lb/in. | Pass |
| D 903 Bonding Strength (24 hrs. @ 95% RH) | Galvanized Steel/ Canvas/SSA | 0.5 lb/in. | Pass |
| D 903 Bonding Strength (7 days @ 160° F.) | Galvanized Steel/ Canvas/SSA | 0.5 lb/in. | Pass |
| C 916/D1151 Bonding Retention (90 days @ 160° F.) | Galvanized Steel/ JM Micromat/SSA | ≥75% fiber bonding | Pass |
| E 84 Surface Burning Characteristics | Cement Board/SSA | 25/50 Flame/Smoke | Pass |
| C 916 Edge Burning | 1" JM Micromat/SSA | No residual flame > 3 sec. | Pass |
| C916 Edge Burning | 1" JM Tuf-Glas/SSA | No residual flame > 3 sec. | Pass |
| C 916 Storage Stability | SSA | No property change after 6 months | In Process |

TABLE 1-continued

| Additional Property Testing | Material | Test Result | Status |
|---|---|---|---|
| Solid Content | SSA | 40% | NA |
| Viscosity | SSA | 1418 cpoise @ 22° C. | NA |
| Dry Reactivation | SSA w/Micromat, Tuf-Glas & Duracore | ~6-10 sec. | NA |
| Repositioning Time | SSA w/Micromat, Tuf-Glas & Duracore | ~10-20 sec. | NA |
| Bonding Time | SSA w/Micromat, Tuf-Glas & Duracore | Partial - 20-60 sec. Full - 24 hrs. | NA |
| Color | SSA | Amber | NA |
| Odor | SSA | Mild sweet/sour smell | NA |

Table 2 reflects the test results of the adhesive using the standards of ASTM C 1071 (Standard Specification for Fibrous Glass Duct Lining Insulation).

TABLE 2

| | Material | Requirement/Allowable | Status |
|---|---|---|---|
| Required Testing | | | |
| C 655 Corrosiveness 95% RH, 120 F., 96 hrs. | Carbon Steel/ Tuf-Glas | No corrosion > control material | Pass |
| C 1104 Water Vapor Sorption | Tuf-Glas/SSA | ≤3% by wt. | Pass |
| C 1104 Water Vapor Sorption | Micromat/SSA | ≤3% by wt. | Pass |
| C 1104 Water Vapor Sorption | Duracore/SSA | ≤3% by wt. | Pass |
| C 1338 Fungi Resistance | Micromat/SSA | No fungal growth | Pass |
| C 411 Temperature Resistance, 250 F. | Duracore/SSA | No flame, smoke, glowing, delamination, etc. | Pass |
| UL 181 Erosion Resistance | Micromat/SSA | No material loss at 2500 fpm air velocity for 6 hrs. | Pass |
| C 1304 Odor Emission 150 F., 30 min. | Micromat/SSA | Not objectionable | Pass |
| E 84 Surface Burning Characteristics | Micromat/SSA | ≤25/50 Flame/Smoke | Pass |
| E 84 Surface Burning Characteristics | Tuf-Glas/SSA | ≤25/50 Flame/Smoke | Pass |
| Apparent Thermal Conductivity | Not tested - adhesive has no influence | NA | NA |
| Sound Absorption Coefficients | Not tested - adhesive has no influence | NA | NA |
| G 22 Bacteria Resistance | Micromat/SSA | No bacterial growth | Pass |
| NFPA 259 Combustion Characteristics | Tuf-Glas/SSA | ≤3500 Btu/lb. | Pass |
| NFPA 259 Combustion Characteristics | Micromat/SSA | ≤3500 Btu/lb. | Pass |
| Additional Testing | | | |
| C 665 Corrosiveness 95% RH, 120 F., 96 hrs. | Galvanized Steel/ Tuf-Glas | No corrosion > control material | Pass |
| C 665 Corrosiveness 95% RH, 120 F., 96 hrs. | Galvanized Steel/ Micromat | No corrosion > control material | Pass |
| C 665 Corrosiveness 95% RH, 120 F., 96 hrs. | Galvanized Steel/ Duracore | No corrosion > control material | Pass |
| C 1617 Accelerated Corrosiveness | Carbon Steel/ Tuf-Glas | No corrosion > control material | Pass |

Table 3 reflects the test results of the adhesive using the standards of ASTM C 1290 (Standard Specification for Flexible Fibrous Glass Blanket Insulation Used to Externally Insulate HVAC Ducts).

TABLE 3

| | Material | Requirement/Allowable | Status |
|---|---|---|---|
| Required Testing | | | |
| C 655 Corrosiveness 95% RH, 120 F., 96 hrs. | Carbon Steel/ Tuf-Glas | No corrosion > control material | Pass |
| C 1104 Water Vapor Sorption | Tuf-Glas/SSA | ≤5% by wt. | Pass |
| C 1104 Water Vapor Sorption | Micromat/SSA | ≤5% by wt. | Pass |

TABLE 3-continued

| | Material | Requirement/Allowable | Status |
|---|---|---|---|
| C 1104 Water Vapor Sorption | Duracore/SSA | ≤5% by wt. | Pass |
| C 1338 Fungi Resistance | Micromat/SSA | No fungal growth | Pass |
| C 411 Hot Surface Performance, 250 F. | Duracore/SSA | No flame, smoke, glowing, delamination, etc. | Pass |
| C 1304 Odor Emission 150 F., 30 min. | Micromat/SSA | Not objectionable | Pass |
| E 84 Surface Burning Characteristics | Micromat/SSA | ≤25/50 Flame/Smoke | Pass |
| E 84 Surface Burning Characteristics | Tuf-Glas/SSA | ≤25/50 Flame/Smoke | Pass |
| Thermal Resistance | Not tested - adhesive has no influence | NA | NA |
| Water Vapor Permeance | Not Applicable to adhesive coatings | NA | NA |
| Additional Testing | | | |
| C 665 Corrosiveness 95% RH, 120 F., 96 hrs. | Galvanized Steel/ Tuf-Glas | No corrosion > control material | Pass |
| C 665 Corrosiveness 95% RH, 120 F., 96 hrs. | Galvanized Steel/ Micromat | No corrosion > control material | Pass |
| C 665 Corrosiveness 95% RH, 120 F., 96 hrs. | Galvanized Steel/ Duracore | No corrosion > control material | Pass |
| C 1617 Accelerated Corrosiveness | Carbon Steel/ Tuf-Glas | No corrosion > control material | Pass |

Turning now to the figures, FIG. 1 is a perspective view of an embodiment of an insulation product 10. As illustrated, the insulation product 10 is fibrous insulation 12 (e.g., insulation blanket made from fiberglass). The fibrous insulation 12 has a length L, a width W, and a thickness H. The fibrous insulation 12 also includes a first major surface 14 and a second major surface 16, which typically extends for the length and width of the fibrous insulation 12. In some embodiments, a facer 18 may couple to the first major surface 14, the second major surface 16, and/or any other surface of the insulation product 10. As explained above, the fibrous insulation 12 uses an adhesive to couple to an object. The adhesive is applied to the first and/or second major surface 14, 16 to form a coating, film, or layer of adhesive. For example, the adhesive may be placed on the first major surface 14 in order to couple a facer 18 to the fibrous insulation 12. In some embodiments, the second major surface 16 may also be coated with adhesive enabling the fibrous insulation 12 to couple to an object (e.g., HVAC component, pipe, duct, etc.). In other embodiments, the insulation product 10 may not include a facer 18 but instead adhesive on the first and/or second surfaces 14, 16. At the time of use, the adhesive is reactivated with liquid water and adhered to the surface of an object. As the adhesive dries, the adhesive couples to the insulation product 10 to the surface and/or object.

Figure 2:
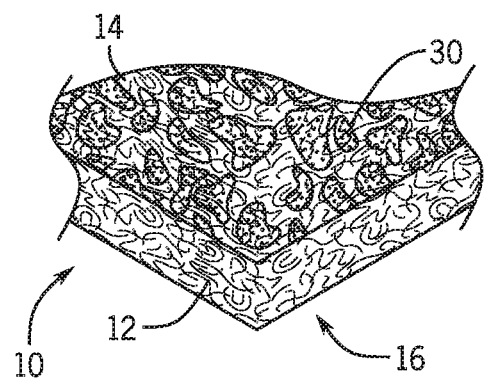
FIG. 2 is a perspective view of an embodiment of an insulation product with an adhesive coating on a major surface.

FIG. 2 is a perspective view of an embodiment of an insulation product 10 with an adhesive coating 30. As illustrated in FIGS. 2-6, the adhesive coating 30 may be applied to the surfaces 14, 16 so as to form a non-continuous and/or non-uniform coating, film, or layer on the insulation product 10. The description of "non-continuous" means that the coating, layer, or film is not a single or solid (i.e., essentially unbroken) coating, layer, or film. The description of "non-uniform" means that the pattern of the coating, layer, or film is random. A potential advantage of a non-continuous and/or non-uniform coating, layer, or film is that less adhesive material is used while providing sufficient adhesion or bonding to a surface. In other embodiments, a continuous and/or uniform coating, layer, or film of the adhesive may be applied to the insulation product as desired.

In some embodiments, the adhesive film, layer, or coating may be about 0.010 to 0.020 inches thick.

Figure 3:
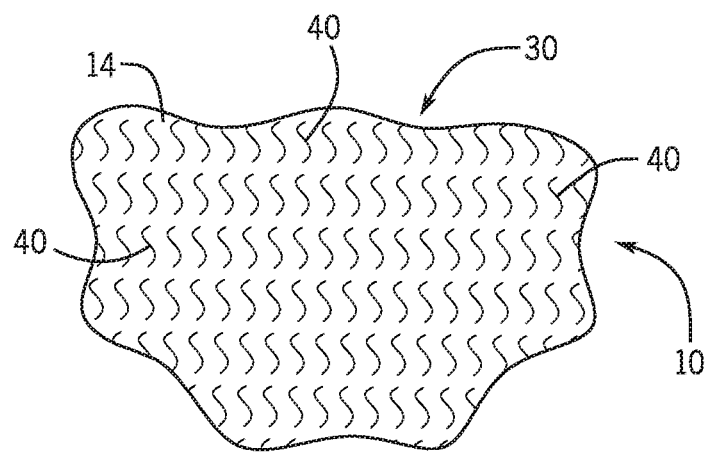
FIG. 3 is a top view of an embodiment of an insulation product with an adhesive coating.
Figure 4:
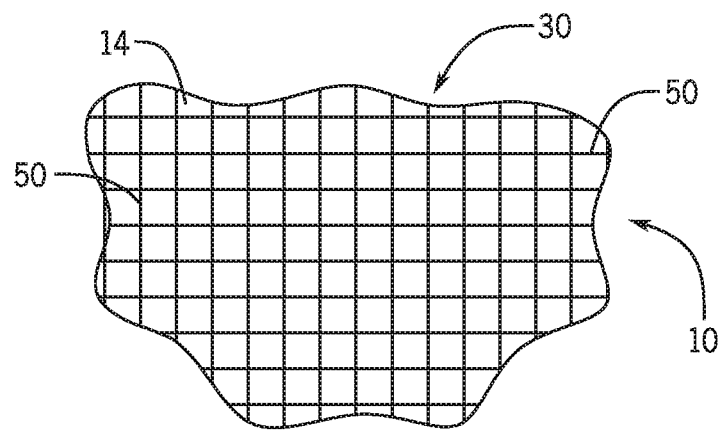
FIG. 4 is a top view of an embodiment of an insulation product with an adhesive coating.
Figure 5:
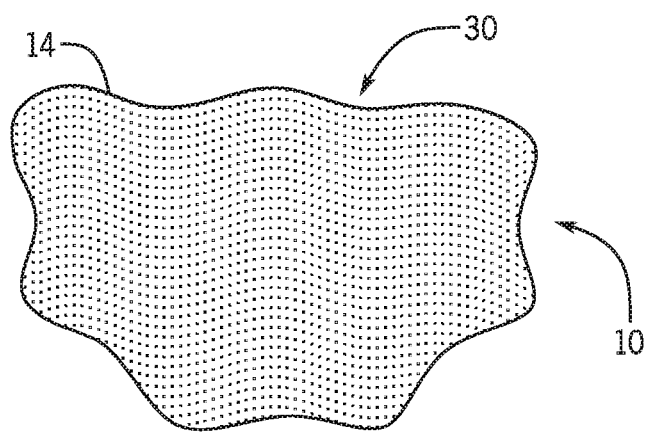
FIG. 5 is a top view of an embodiment of an insulation product with an adhesive coating.

In FIG. 3, the adhesive coating 30 may be applied to the insulation product 10 with a plurality of way lines 40 (e.g., an S-shaped pattern). In FIG. 4, the adhesive coating 30 may be applied in a series of parallel and/or crisscrossing straight lines 50. And in FIG. 5, the adhesive coating 30 may be applied in a repeating dot pattern, or in some embodiments an irregular splat pattern. In still other embodiments, the adhesive coating 30 may be applied in other patterns such as honeycomb. By not completely covering the surfaces 14, 16 less adhesive may be used while still enabling the insulation product to adhere to the surface of an object.

Figure 6:
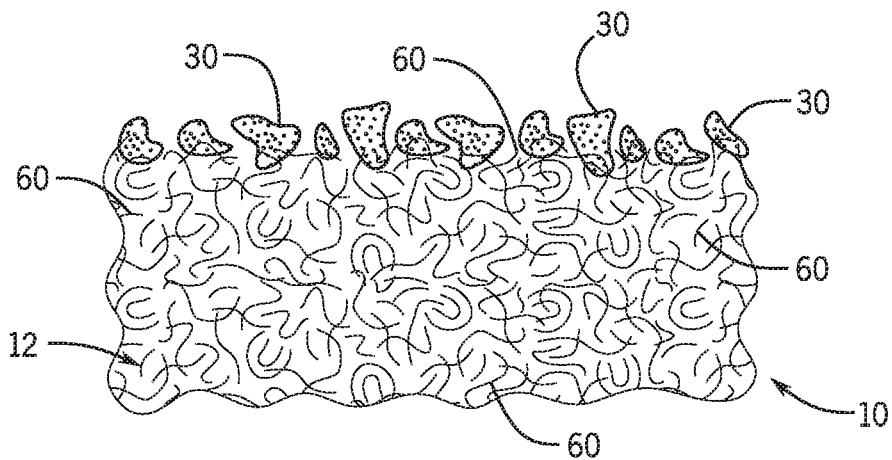
FIG. 6 is a cross-sectional view of an embodiment of an insulation product with an adhesive coating.

FIG. 6 is a cross-sectional view of an embodiment of an insulation product 10. As illustrated, the adhesive coating 30 couples to the fibers 60 (e.g., fiberglass). The 35 adhesive coating 30 may adhere to the insulation product 10 through adhesion to the actual fibers 60 and/or by adhering to itself around the fibers 60 (e.g., wrapping around the fibers 60).

Figure 7:
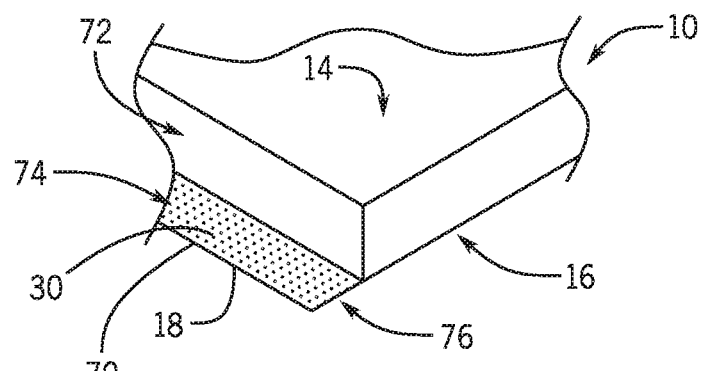
FIG. 7 is a perspective bottom view of an embodiment of an insulation product with a facer.

FIG. 7 is a bottom view of an embodiment of an insulation product 10 with a facer 18. The insulation product 10 may be similar to any of the insulation products described herein (e.g., fibrous insulation, board, etc.). However, the insulation product 10 includes a facer 18 that is wider than the width of the insulation product 10 to form a flange 70 on a side 72 of the insulation product 10. While not shown, the insulation product 10 may include one or more additional flanges 70 on other sides of the insulation product 10. For example, the insulation product 10 may include four flanges 70 one for each side of a square or rectangular insulation product 10. Differently shaped insulation products 10 may include different numbers of flanges 70 (e.g., 1, 2, 3, 4, 5, 6, etc.). In some embodiments, the flanges 70 may extend from the insulation product 10 by 0.5, 1, 1.5, 2, 2.5, 3, or more inches.

The adhesive coating 30 described herein may be applied to first and/or second sides 74, 76 so that one or both sides of the flanges 70 include a layer, coating, or film of the adhesive coating 30. This allows the flange 70 to be wetted and pressed against an object surface to adhere or bond the insulation product 10 to the object. In some embodiments, the second major surface 16 may also be coated or layered with the adhesive coating 30 to allow these portions of the insulation product 10 to also adhere or bond 20 with an object's surface. In some embodiments, the entire surface on the side 74 of the facer 18, or a substantial portion thereof, may be coated with the adhesive coating 30 prior to coupling the facer 18 to the insulation product 10. The adhesive coating 30 may bond the facer 18 to the insulation product 10 in addition to providing the flange 70 that is adherable or bendable to other objects.

Figure 8:
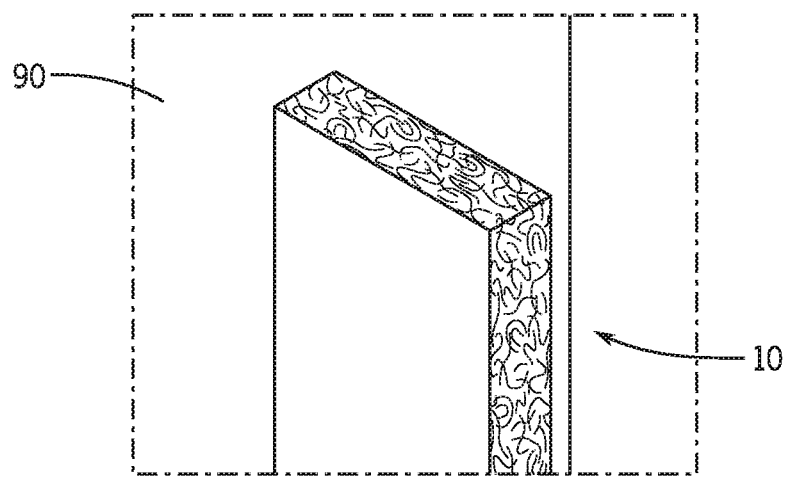
FIG. 8 is a perspective view of an embodiment of an insulation product coupled to an object.

FIG. 8 is a perspective view of an embodiment of an insulation product 10 coupled to an object 90. As explained above, the insulation product 10 is bonded or adhered to the object 90 by wetting the dry adhesive layer, adhesive coating 30, or film with liquid water and then placing the insulation product 10 against the object 90 for a period of time (e.g., 1-10 seconds). After the period of time, the adhesive coating 30 bonds the insulation product 10 to the surface of the object.

Figure 9:
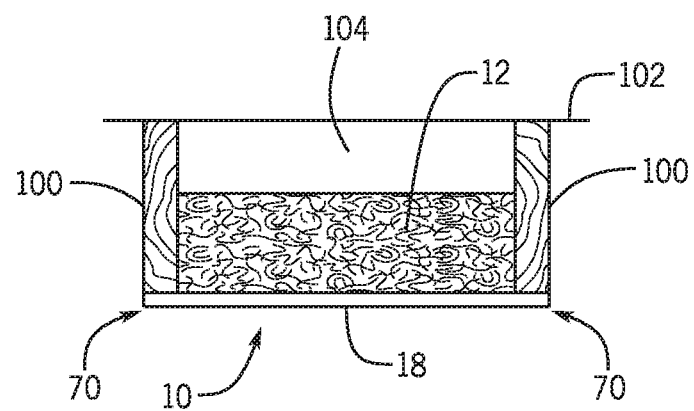
FIG. 9 is a cross-sectional view of an embodiment of an insulation product coupled to an object.

FIG. 9 illustrates an insulation product 10 bonded or adhered between studs or joists 100 of a wall 102, ceiling, or floor. The insulation product 10 includes a facer 18 that may adhere to the studs 100 via the adhesive coating, layer, or film of the flanges 70. Specifically, liquid water may be applied to the flanges 70 so that the flange's adhesive coating forms a gel or viscous fluid that adheres the flanges 70 to the studs 100 and/or inner stud walls. In some embodiments, the sides and/or a top surface of the insulation product 10 may include an adhesive coating and may also adhere the insulation product 10 to the studs 100 and/or wall. In some embodiments, the studs 100 may be deeper than the insulation product 10 so that a cavity 104 is formed between a top surface of the insulation product 10 and the wall 102. The insulation product 10 may be pushed between the studs 100 to reduce or eliminate the cavity 104.

The adhesive allows the insulation product 10 to be coupled between the studs 100 without the use of clips, pins, staples, and the like. When the insulation product 10 is used in a crawl space or a ceiling, the adhesive may couple the insulation product 10 between joists 100 without using a lightning rod, which is typically used to hold the insulation product 10 in place. The adhesive greatly simplifies installation because an installer may simply wet the flanges 70, and/or side or top surface, let the adhesive tack up for a few seconds, and then crawl underneath the joists 100, and press the insulation product 10 in position. The adhesive will then set up and hold the insulation product 10 in position. The adhesive offers a similar advantage in coupling insulation products to steel studs, ducts, pipes, etc.

Figure 10:
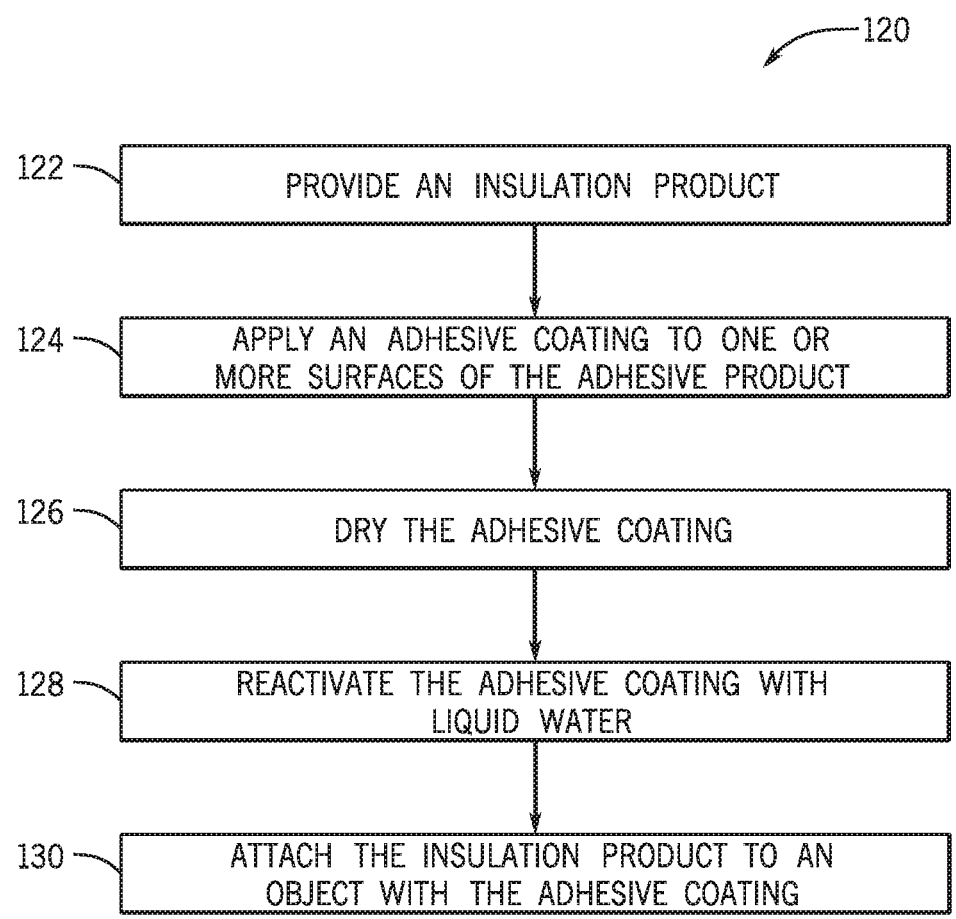
FIG. 10 is a flowchart of a method of making a self-stick insulation product.

Referring now to FIG. 10, illustrated is a method 120 of making a insulation product and attaching the insulation product to an object. At block 122, an insulation product is provided. As described herein, the insulation product has a length, a width, a thickness, and a first major surface and a second major surface which each extend for the length and width of the insulation product. At block 124, an adhesive is applied to one or more surfaces of the insulation product. As explained above, the adhesive may be applied to the insulation product using any number of patterns (e.g., wavy lines, straight lines, crisscrossing lines, orthogonal lines, honeycomb pattern, a dot pattern, a splat pattern). At block 126, the adhesive coating is dried (e.g., air dried, passed through an oven, etc.) to evaporate the water in the adhesive so that the adhesive coating forms a dry layer on the insulation product. In a dried state, the adhesive may not adhere or bond with another object. In order to reactivate the adhesive for bonding, liquid water is applied to the adhesive coating, block 128. After reactivation of the adhesive coating, the insulation product may then be bonded to an object (e.g., wood, metal, plastic, etc.), block 130.

In some embodiments, the dry layer of adhesive may comprise between 0.1% and 10% of the fibrous insulation blanket by weight, although a range of between 2% and 8% is more common. In other embodiments, the dry layer of adhesive may comprise between 1% and 6%, between 3% and 5%, or about 3% to 4% of the fibrous insulation product by weight. In some embodiments, the amount of adhesive applied may depend on the application process. For example, continuous or relatively continuous adhesive coatings may have a dry layer of 8% or 10% by weight of the blanket while an S pattern application could comprise less than 2% by weight of the blanket. In some embodiments, the dry adhesive layer may become re-adherable or rebondable to other objects upon application of water between about 1% and 15%, 5% and 25%, or about 10% by weight of the insulation product. In some embodiments, upon the subsequent application of water, the adhesive may have a tacky or working state that allows the fibrous insulation product to be repositioned with respect to an object that the adhesive is applied to. The adhesive may be in the tacky or working state between 1 second and 30 seconds, after the application of liquid water. The adhesive may change to the tacky or working state within 10 seconds, within 5 seconds, and the like upon the application of water. Once the adhesive dries, the adhesive may remain nonadherable or nonbondable to other surfaces even when subjected to a relative humidity of up to 100%.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:
1. A self-stick insulation, comprising:
   an insulation product, the insulation product comprising:
      a length;
      a width;
      a thickness; and
      a first major surface and a second major surface that extend the length and the width of the insulation product;
   an adhesive coating applied to the first major surface and the second major surface of the insulation product, the adhesive coating comprising:
      between about 30-55% by weight of solids of the adhesive coating of at least one of polystyrene-maleic anhydride (SMA) and polyacrylic acid (PAA);
      between about 10-15% by weight of solids of the adhesive coating of an alcohol amine; and
      between about 30-60% by weight of solids of the adhesive coating of at least one of a polyvinyl alcohol and a starch;
      wherein the adhesive coating is activated with an application of liquid water; and
   a facer adhered to the second major surface of the insulation product via the adhesive coating.
2. The self-stick insulation of claim 1, wherein the adhesive coating comprises a non-continuous and non-uniform coating atop the first major surface.

3. The self-stick insulation of claim 1, wherein the insulation product comprises 1-8% by weight of the adhesive coating after the adhesive coating is applied and dried to the insulation product.

4. The self-stick insulation of claim 1, wherein the facer comprises at least one material selected from the group consisting of a paperboard material, a cardboard material, a foil, a scrim, and a polymer material.

5. The self-stick insulation of claim 1, wherein the facer comprises one or more flanges that extend beyond an edge of the second major face of the insulation product.

6. The self-stick insulation of claim 1, wherein the insulation product comprises at least one material selected from the group consisting of fiberglass, mineral wool, slag wool, rock wool, and foam.

7. The self-stick insulation of claim 1, wherein the alcohol amine comprises at least one of monoethanolamine (MEA), diethanolamine (DEA), and triethanolamine (TEA).

8. The self-stick insulation of claim 1, wherein the adhesive coating passes a D 903 bonding strength (Ambient) test based on standards of ASTM C 916.

9. The self-stick insulation of claim 1, wherein the adhesive coating passes a C 916/Dl 151 Bonding Retention (90 days@ 160° F.) test based on standards of ASTM C 916.

10. The self-stick insulation of claim 1, wherein the adhesive coating passes a C 916 Edge Burning test based on standards of ASTM C 916.

* * * * *